UNITED STATES PATENT OFFICE.

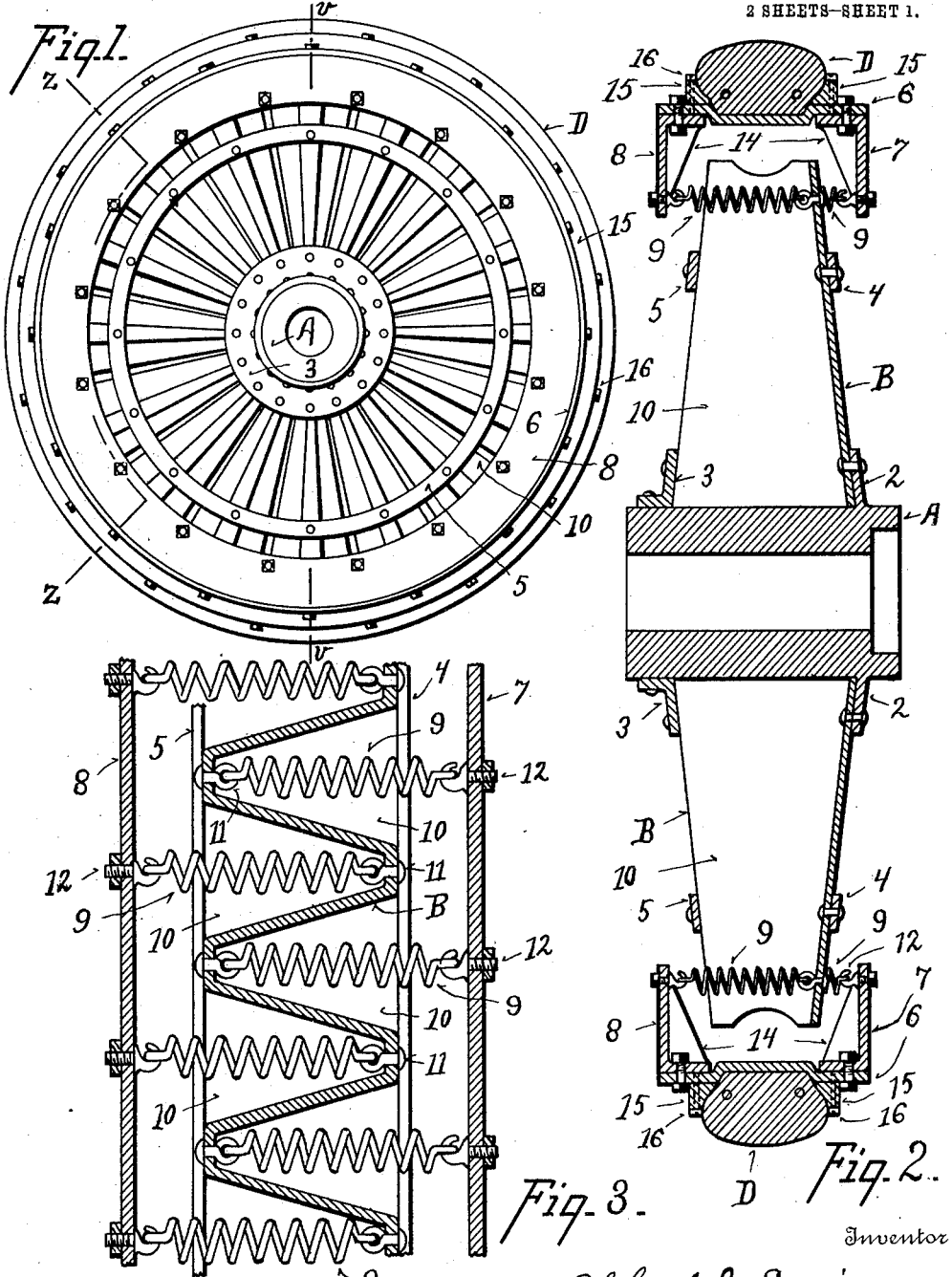

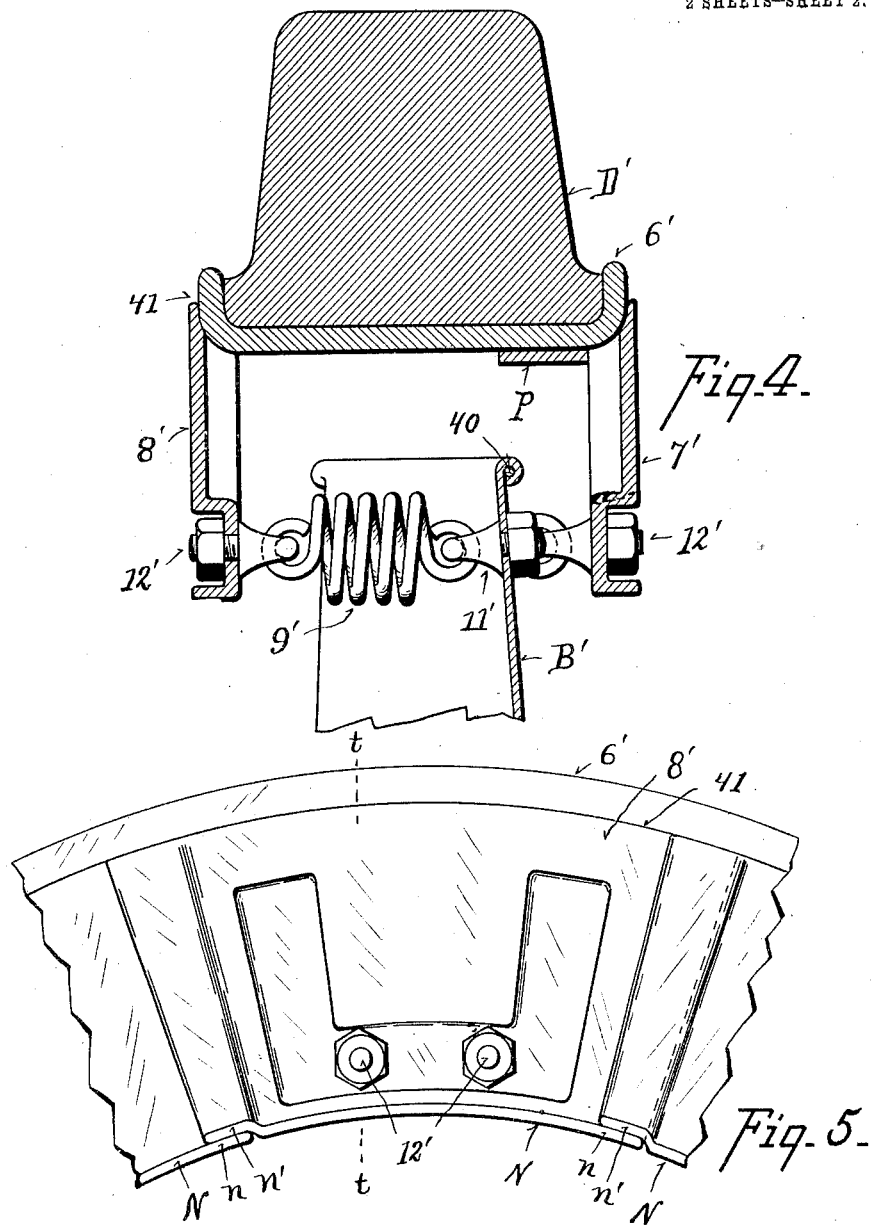

ALFRED J. SWING, OF CINCINNATI, OHIO.

VEHICLE-WHEEL.

1,089,511.  Specification of Letters Patent.  Patented Mar. 10, 1914.

Application filed February 26, 1913. Serial No. 750,827.

*To all whom it may concern:*

Be it known that I, ALFRED J. SWING, a citizen of the United States, residing at Cincinnati, in the county of Hamilton and State of Ohio, have invented certain new and useful Improvements in Vehicle-Wheels, of which the following is a specification.

My invention relates to improvements in vehicle wheels.

One of its objects is to provide an improved construction whereby the rim or tire is yieldingly supported relative to the hub.

Another object is to provide an improved rim construction whereby the tire is firmly supported by the rim and the rim yieldingly supported relative to the hub members.

Another object is to provide for an offset or staggered relation of the spring or yielding members to secure a maximum length thereof and an improved form of light but rigid support therefor intermediate of said springs and the hub.

My invention also comprises certain details of form, combination and arrangement, all of which will be fully set forth in the description of the accompanying drawings in which:

Figure 1 is a side elevation of a wheel embodying my invention. Fig. 2 is a central vertical section through the same on line $v$ $v$ of Fig. 1. Fig. 3 is an enlarged detail sectional view on line $z$ $z$ of Fig. 1. Fig. 4 is an enlarged sectional detail illustrating a modification on line $t$ $t$ of Fig. 5. Fig. 5 is a side elevation of a portion of the rim illustrated in Fig. 4.

The accompanying drawings represent the preferred embodiments of my invention.

In Figs. 1, 2, and 3, A represents the hub upon which is rigidly mounted a radially corrugated disk or web B, preferably formed by stamping from sheet metal. The member B serves in place of spokes to support the rim and tire relative to the hub, and is itself rigidly secured to the hub by means of a flange 2 which may be formed integral with the hub on one side and a detachable flange 3 at the opposite side. Rings or annular braces 4 and 5 are also preferably employed to stiffen and hold the corrugations of member B in place. A solid rubber tire D is preferably employed and is seated firmly upon a yoke shaped rim comprising an annular slightly dished rim member 6 and two annular members 7 and 8 of angular cross section detachably secured to member 6 so as to form a rim yoke shaped in cross section, the arms of which yoke embrace the periphery of member B. A series of horizontally disposed coiled springs 9 are partially seated or housed in the grooves or channels 10 formed by the corrugations of member B, in a staggered arrangement, and are connected at one end by eye-bolts 11 to said member B. Said springs at their opposite ends are connected respectively to members 7 and 8 by means of eye-bolts 12. Said eye-bolts serve to pivotally connect the springs at opposite ends to said members B and 7 and 8, so that said members can change their relative positions in any direction by reason of said pivotal movement. Said springs are also under tension so as to normally hold the rim and tire concentric with the hub, but permit the rim and tire to yield relative to the hub under strain, thereby providing a yielding or cushioned tread for the wheel in addition to that provided by the solid rubber tire. The corrugations of member B and the springs mounted in staggered relation relative thereto provide for the use of springs of maximum length, as well as great strength, and rigidity compared with the weight of material in member B. The rim members are capable of construction from sheet metal to attain maximum strength for weight of material employed, and the angular cross section of members 7 and 8, with braces 14 stamped therein produce when united to the member 6 a firm and rigid member of yoke shaped cross section to resist the strain of the springs. Annular beads 15 are detachably secured by bolts 16 to the member 6 after the tire is in place to retain it in position.

In operation the periphery of member B is designed under excessive strain either radial or angular to seat upon the inner face of member 6 under radial strain or against the ribs 14 of members 7 and 8 under angular strain to limit the relative movements of the rim to said member B and prevent overloading and excessive strain on the springs.

As illustrated in Figs. 4 and 5 D' represents the solid rubber tire seated upon a rim member 6'. In place of providing continuous annular members 7 and 8 which would require large and expensive dies to stamp, I provide a detachable rim member 7' composed of a series of interlocking ribbed plates or segments N which are autogeneously welded together at their overlapping edges n n' and also welded to an annular band P which is closely fitted and preferably bolted to members 6'. The member 8' is formed of similarly overlapped plates which are permanently welded together at their meeting edges and also welded to member 6' at 4', thereby forming a yoke shaped rim to embrace the periphery of a corrugated member B' similar to member B of Fig. 2. As illustrated in Fig. 4 the peripheral edge of member B' where it is likely to seat under heavy strain against the inside of the rim is beaded or turned about a wire 40 before member B' is corrugated, thereby strengthening the engaging surface.

It will be apparent that the members of my improved wheel are reversible in position, that is the corrugated member B or B' may be attached to the rim and the yoke forming members 7 and 8 or 7' and 8' may be attached to the hub, and then connected as illustrated by the springs 9 or 9' in staggered relation by yoke shaped bolts 11' and 12'. The number, width and depth of the corrugations of member B may be varied, depending upon the conditions and use to be made of the wheel.

The structure herein illustrated and described is capable of considerable modification without departing from the principle of my invention.

Having described my invention, what I claim is:

1. A vehicle wheel comprising a hub, a tire, an annular rim rigidly supporting said tire and of yoke shaped cross-section, a circumferential radially corrugated web rigidly attached to said hub and extending therefrom to said rim and a plurality of flexible connecting members pivotally attached at one end to said web at the base of the channels formed by said radial corrugations and partially housed in said channels and pivotally connected at the opposite ends respectively to opposite sides of said rim, said flexible connecting members overlapping each other along the transverse medial line of the wheel.

2. A vehicle wheel comprising a hub, a tire, a rim, a web, and flexible connecting members pivotally connected respectively at opposite ends to said rim and web, said rim and web being so arranged that while one is radially corrugated the other is forked or yoke shaped in cross section to embrace one end of said radially corrugated member, and said flexible connecting members connected at one end at the base of the channels formed by said radial corrugations and at their opposite ends alternately to opposite forks of said yoke shaped member to cause said flexible connecting members to overlap at the transverse medial line of the wheel.

3. A vehicle wheel comprising a hub, a tire, a circumferential web radially corrugated to form radial channels on opposite sides extending from said hub to the rim, a rim of forked or yoke shaped cross section embracing the periphery of said web, and flexible connecting members pivotally connected at one end to said web at the base of the channels formed by said radial corrugations, and pivotally connected at the opposite end alternately to opposite forks of said rim.

4. A vehicle wheel comprising a hub, a tire, a circumferential radially corrugated web, a rim of yoke shaped cross section composed of an annular rim member to serve as a seat and support for the tire, an inwardly turned fork or flange formed of interengaging segmental sections rigidly secured to said annular rim member, and a detachable fork or flange formed of interengaging segmental sections rigidly secured together and detachably secured to said annular rim member, and flexible connecting members pivotally connected at one end to said web at the base of the channels formed by said radial corrugations, and at the opposite end alternately to opposite forks of said rim member.

5. A vehicle wheel comprising a hub, a tire, a radially corrugated web rigidly attached to the hub, a rim of forked or yoke shaped cross section embracing the periphery of said web, and flexible connecting members pivotally connected at one end to said web at the base of the channels formed by said radial corrugations and pivotally connected at the opposite forks of said rim, the periphery of said web being in position to engage and seat upon the inner face of said rim under excessive radial or transverse strain to limit the tension on said flexible connecting members.

In testimony whereof I have affixed my signature in presence of two witnesses.

ALFRED J. SWING.

Witnesses:
C. W. MILES,
RICHARD C. SWING.